INVENTORS
Hermann Scholl
Friedrich Rabus
Dieter Eichler
Volker Kobelbach
Wolfgang Reichardt
Peter Jürgen Schmidt by Richard J. Stoner
Atty

United States Patent Office 3,433,101
Patented Mar. 18, 1969

3,433,101
ELECTRONIC ARRANGEMENT FOR SHIFTING GEARS IN MOTOR VEHICLES
Hermann Scholl and Friedrich Rabus, Stuttgart, Dieter Eichler, Bonlanden, Volker Kadelbach, Heutingsheim, Wolfgang Reichardt, Stuttgart-Rohr, and Peter Jürgen Schmidt, Botnang, Germany, assignors to Robert Bosch GmbH., Stuttgart, Germany
Filed Jan. 11, 1967, Ser. No. 608,520
Claims priority, application Germany, Jan. 27, 1966, B 85,564
U.S. Cl. 74—866
Int. Cl. G05d 13/62
16 Claims

ABSTRACT OF THE DISCLOSURE

An electronic control arrangement for shifting gears automatically in a motor vehicle, as a function of speed and load or throttle position. A tachometer providing an output proportional to the vehicle speed, actuates a plurality of electronic switching circuits at predetermined and different levels of the tachometer output. The switching circuits, energize, in turn, electromagnetic coils each associated with a particular gear of the motor vehicle. The electromagnetic coils act upon hydraulic operating mechanisms to accomplish the appropriate gear shifting process. The switching circuits are designed so that their operation is independent of the battery voltage in the motor vehicle.

Background of the invention

Control arrangements for shifting gears automatically in motor vehicles are commonly known in the art. These arrangements are, however, connected directly to the battery of the motor vehicle and are particularly dependent upon any fluctuations or variations in the output level of the battery. Since the battery output voltage in an automotive vehicle may vary over a wide range, operation of automotive shifting arrangements, heretofore, have been unsatisfactory because of their erratic characteristics. Furthermore, these commonly-known control arrangements are also affected by voltage signals generated at random during usual operation of the control arrangements. In applying such automatic control arrangements for shifting gears, it is necessary above all, to prevent shifting to a lower gear, in the event that a sudden drop in the battery voltage is incurred.

Summary of the invention

An electronic control arrangement for automatic shifting of gears in a motor vehicle, comprising, in combination, tachometer means providing an output voltage proportional to the speed of the vehicle, a plurality of electronic switching circuits each connected to the output voltage and actuated thereby at a predetermined different value of the output voltage, voltage supply means for energizing the switching circuits, voltage stabilizing means connected to the voltage supply means and providing a voltage level independent of variations in the potential of the voltage supply, circuit operation stabilizing means connected to the voltage stabilizing means and acting upon each of the switching circuits to maintain the operation of the switching circuits independent of fluctuations of the voltage supply electromagnetic means connected to each of the switching circuits and energized thereby, and operating means actuated by the electromagnetic means for automatic shifting of gears of the motor vehicle in a predetermined manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Description of the preferred embodiments

Figure 1:
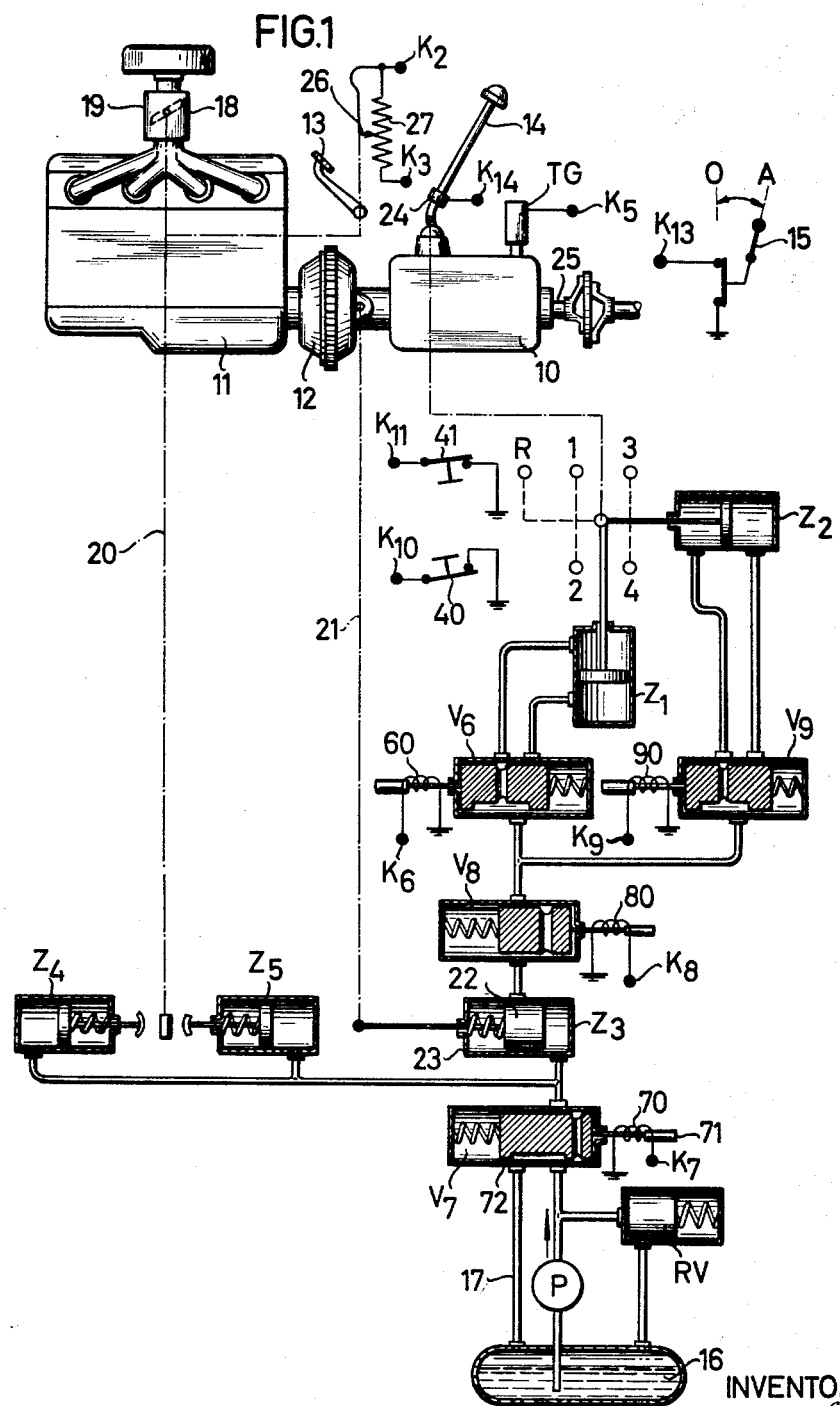
FIG. 1 is a functional schematic diagram showing an internal combustion engine of a motor vehicle operating in conjunction with a centrifugal clutch to which is coupled a gear shift mechanism and associated hydraulic actuating means.

Referring to the drawing, the electronic arrangement, in accordance with the present invention cooperates with the manual or hydraulic-operated gear shift mechanism 10, the centrifugal clutch 12, and the combustion engine 11. The centrifugal coupling 12 may be disengaged by hydraulic means when the selector arm 15 of a switching arrangement is placed in the position "A". In this position of the switching arrangement and when the coupling 12 is disengaged, the gear shift mechanism 10 may be moved into its individual modes of operation through the aid of the hydraulic cylinders $Z_1$, $Z_2$. Once the gear shift mechanism is in its proper mode of operation, depending upon the speed of the vehicle and the position of the gas pedal 13, the coupling 12 reengages itself. A gear shift lever 14 is mounted on top of the housing for the gear shift mechanism. When the selector arm is in the position "O," corresponding to the non-automatic mode of operation, the gear shift mechanism may be manually operated. When, on the other hand, the selector arm 15 is located in the "A" or automatic position, the hydraulic shifting cylinders $Z_1$ operate the gear shift mechanism so that the latter is shifted to and from any one of its four modes of operation. The hydraulic cylinder $Z_2$ serves to turn the gear shift lever 14 out of the first and second positions or modes of operation and into the third and fourth positions, by way of the neutral position. The gear shift lever 14 moves, thereby, along with the electrically controlled automatic arrangements.

The hydraulic power is derived from oil pressure generated by a gear pump P having an intake leading to an oil reservoir 16. Provided that the coil 70 of the electromagnetically controlled valve $V_7$ is deenergized, corresponding to the position when the arrangements are in their operative state, the pump P circulates the oil freely. The electromagnetic valve $V_7$ is operated by applying an actuating voltage to the terminal $K_7$ of the coil 70. When the latter becomes thus energized the armature 71 is drawn into the interior of the coil and thereby moves the cylinder or piston 72 towards the left. When the piston 72 is displaced in this manner, the return path 17 of the circulating oil is closed off, and as a result pressure is built up at the outlet of the gear pump P. A pressure control valve RV regulates the pressure developed by the pump, independent of its speed of rotation.

The pressurized oil from the outlet of the gear pump P has access to the three hydraulic cylinders $Z_3$, $Z_4$ and $Z_5$. The cylinders $Z_4$ and $Z_5$ operate a mechanical linkage 20 shown in dotted form, connected to a throttle valve 18 of a carburetor 19. The actuation is such that the throttle valve 18 is placed in an optimum position for gear shifting whereby the engine speed is approximately 200 r.p.m. greater than the idling speed corresponding to 600 r.p.m. of the combustion engine 11. At the same time, the cylinder $Z_3$ operates the linkage 21 so as to disengage the centrifugal clutch 12. During this action, the piston 22 moves toward the left and against the action of a spring 23, and thereby permits the pressurized oil to flow freely toward the electromagnetically actuated cut-off valve $V_8$. The latter has an electromagnetic coil 80 provided with a terminal $K_8$ connected to the control arrangement shown in FIG. 2.

As a result of the sequential operation of the hydraulic cylinders $Z_3$ and cut-off valve $V_8$, assurance is had that the two-branch connected electromagnetically controlled valves $V_6$ and $V_9$ do not receive pressurized oil unless the centrifugal clutch 12 is disengaged, and the engine is simultaneously throttled. In this manner, hydraulic cylinders $Z_1$ and $Z_2$ are actuated through the valves $V_6$ and $V_9$, respectively, only under the desired conditions.

The control arrangement is also designed so that when disconnected from the automatic modes of operation, the clutch 12 becomes disengaged when the shifting lever 14 is grasped. Once the lever 14 is thus actuated, it may be then moved into the desired four forward gears or in reverse gear. When the driver has released the gear shift lever 14, and steps upon the gas pedal, the clutch 12 becomes automatically engaged once the engine speed exceeds approximately 1200 r.p.m. In this connection, a switch 24 is provided with the gear shift lever 14. This switch 24 is in the normally open position and connected to the terminal $K_{14}$ which acquires ground potential as soon as the driver grasps the gear shift lever 14. The switch 24 operates in conjunction with the automatic control arrangement so that automatic gear shifting is inhibited as long as the driver maintains manual contact with the gear shift lever 14.

When one desires to shift manually and allows the selector switch 15 to remain in the "O" position, corresponding to the non-automatic mode, it is only necessary to close the ignition switch ZS associated with the ignition system of the engine (not shown), and then to start the engine. In series with the closed ignition switch ZS and the positive terminal of the battery BA of the vehicle, is the relay D, shown in FIG. 2. For as long as the driver grasps the gear shift lever 14, the relay D is energized through the switch $C_1$ which is connected as shown in the drawing, when operating in the non-automatic mode. The switch $C_1$ connects the other terminal of the relay D to the terminal $K_{14}$ and thereby permits current to flow through the coil 70 as a result of the closure of the switch $d$. Since the coil 70 is associated with the pressure control valve $V_7$, the hydraulic cylinder $V_3$ can cause the disengagement of the clutch 12.

Once the gear shift lever 14 is released and the switch 24 is thereby opened, the centrifugal clutch 12 becomes reengaged. At the same time, the relay D is released and as a result of the opening of the switching contact $d$, associated with the relay D, the coil 70 of the pressure control valve $V_7$ is deenergized. When the clutch 12 is engaged, the transmission of the engine torque across the gear shift mechanism 10 and to the driving wheels takes place only if the engine speed exceeds 1200 r.p.m. as a result of pressing the gas pedal 13. These operational steps are repeated for each manual shifting of the gears.

The relay D also executes these same functions upon every gear shift, when the electronic arrangement is in the automatic mode of operation, and dependent upon the vehicle speed and the load position of the gas pedal or accelerator 13.

For purposes of controlling automatically the gear shift mechanism 10 as a function of speed, the drive shaft 25 is coupled to a tachometer TG. The latter provides, at its output terminal $K_5$, an alternating-current signal proportional to the speed of the vehicle. This alternating current signal is rectified and serves as a control signal for three switching arrangements designated by $B_1$, $B_2$ and $B_3$ as outlined in FIG. 2 through the dotted lines. The switching circuit $B_1$ includes an input transistor $T_3$ and an output transistor $T_4$ and causes automatic transfer from first gear into second gear when the rectified output signal of the tachometer TG exceeds a predetermined value. At the same time, automatic switching from second gear into first gear results when this tachometer signal drops below a predetermined value.

For purposes of shifting from second gear to third gear, the second switching circuit $B_2$ having an input transistor $T_5$ and an output transistor $T_6$ becomes activated. The third switching circuit $B_3$ is associated with the shifting of gears from third to fourth, and has an input transistor $T_7$ and output transistor $T_8$. These last two switching circuits will also transfer to the lower gear shifts when the tachometer output voltage drops below a predetermined value. In order to control the automatic gear shifting as a function of load, so that shifting to a higher gear under heavy load conditions takes place at a higher speed than that which would prevail when the engine is not loaded, the gas pedal 13 is coupled to the sliding terminal 26 of a variable resistor 27. The latter has two terminals $K_2$ and $K_3$ electrically connected to the control arrangement.

Figure 2:
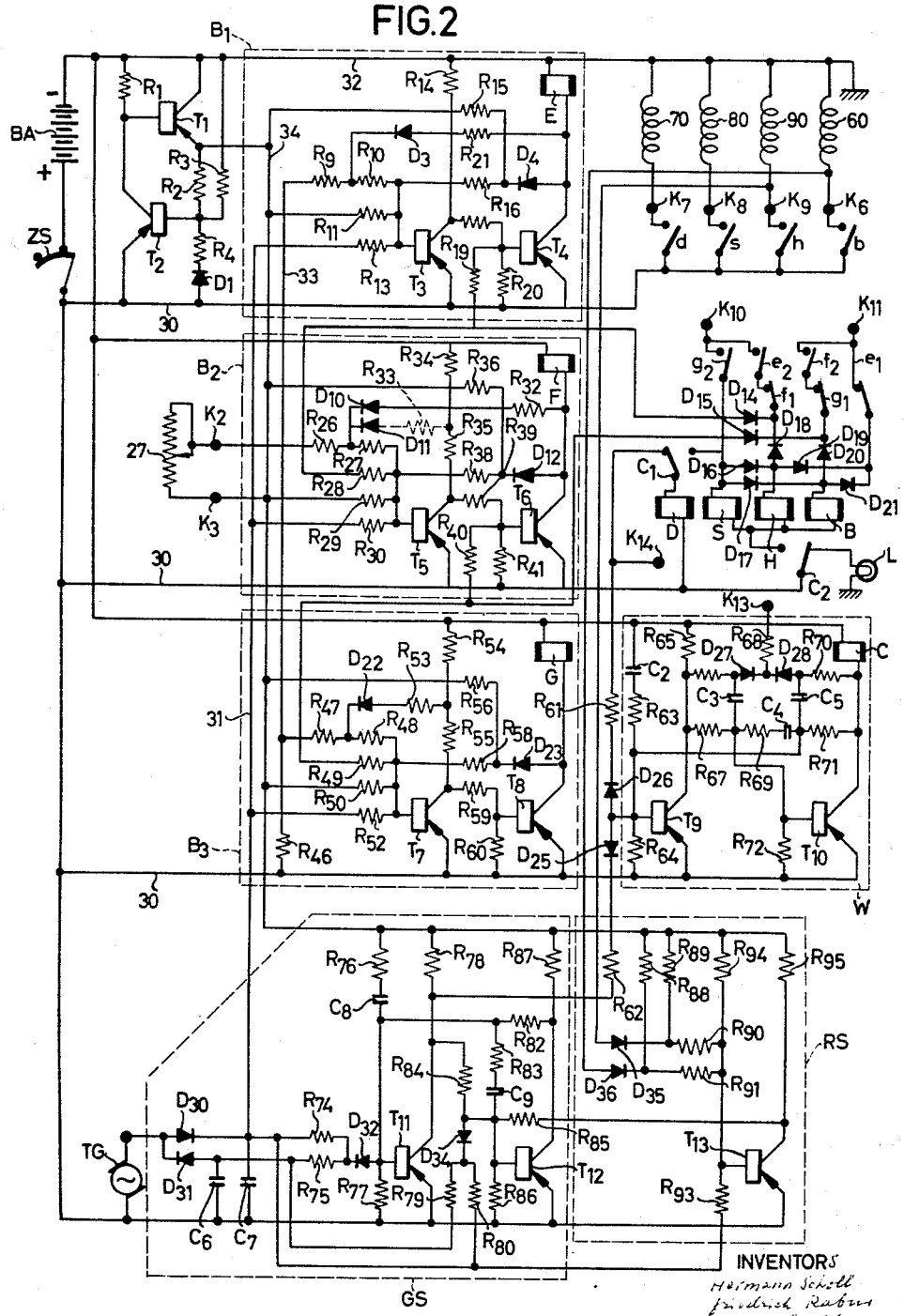
FIG. 2 is an electrical schematic diagram of a control arrangement for actuating the hydraulic means in a prescribed manner.

Each of the output transistors within the aforementioned switching circuits $B_1$, $B_2$ and $B_3$ has the coil of an electromatic relay, in its collector circuit. Thus, the relay coil E of the first switching circuit $B_1$ has a normally closed contact $e_1$ and a normally open contact $e_2$. The relay coil F of the second switching circuit $B_2$ has a normally closed contact $f_1$ and a normally opened contact $f_2$. The relay coil G and its normally closed contact $g_1$, and normally open contact $g_2$ is associated with the third switching circuit $B_3$. The normally open contacts are closed when the corresponding relay coils are deenergized. These normally open contacts are opened when the corresponding relay coil becomes energized through the output transistor. At the same time the normally closed contacts are in their closed positions when the relays are energized and open when deenergized. FIG. 2 shows a number of relay contacts and their closed positions: the contacts $c_1$ and $c_2$ of relay C associated with a switching circuit W; the contact $d$ of the pressure control relay D, already described in connection with the coil 70 of the pressure control valve $V_7$; contact $s$ of the relay S connecting with the terminal $K_8$ for purposes of actuating the blocking or cut-off valve $V_8$; the contacts $h$ of relay H associated with the turning valve $V_9$; and finally the contact $b$ of relay B associated with the shifting valve $V_6$.

Since the three switching circuits $B_1$, $B_2$ and $B_3$ are to change their states as a function of the output signal, of the tachometer TG, as well as the position of the gas pedal and the variable resistor or potentiometer 27, all three switching circuits are connected, through their input transistors to the control lines 31 and 33. The three switching circuits are coupled to these lines in a manner whereby they are decoupled from each other. The speed varying control voltage is derived by rectifying the output of the tachometer TG through means of diodes $D_3O$, and applying a smoothing process through the capacitor $C_7$. This capacitor is connected to the base of the transistors $T_3$ and $T_5$ and $T_7$, by way of the resistors $R_{13}$, $R_{30}$ and $R_{52}$, respectively, associated with the switching circuits $B_1$, $B_2$ and $B_3$. A second control voltage is set in accordance with the loading of the engine through the positioning of the potentiometer 27. The latter is connected to the input transistors of the switching circuits by way of its terminals $K_2$ and $K_3$ as well as the conducting line 33 in conjunction with the positive supply line 30. The line 33 connected to the line 30 by way of resistor $R_{46}$, leads to the input transistor through means of the resistors $R_9$ and $R_{10}$, $R_{26}$ and $R_{27}$, and $R_{47}$ and $R_{48}$. In order that the load-dependent signal appearing across resistor $R_{46}$ does not vary with the voltage output of the battery BA, the potentiometer 27 is connected to a stabilizing or regulating arrangement, by way of its terminal $K_3$. This terminal is provided with a constant voltage of −4 volts from the stabilizing arrangement when the conducting path 30 is at zero potential. The stabilization arrangement comprises a transistor $T_1$ having a collector connected to the negative supply line 32. The emitter of this transistor is connected to the terminal $K_3$ of the potentiometer, by way of the conducting path 34. The base of this transistor $K_1$ is connected, by way of the resistor $R_1$, to the negative supply line 32, as well as to the collector of the transistor $T_2$. The latter is a silicon control transistor of the P-N-P type, similar to transistor $K_1$. The emitter of the transistor $T_2$ is connected to the positive supply line 30. The base of the transistor $T_2$ leads to the positive supply line 30, by way of the resistor $R_4$ and diode $D_1$. This base is also connected to the emitter of transistor $T_1$, by way of resistor $R_2$, and to the negative supply line 32, by way of the resistor $R_3$. This stabilization arrangement functions to maintain a substantially constant level of −4 volts at the terminal $K_3$ when the battery voltage varies within the range of 5 to 8 volts. For this comparatively small regulating region, it is sufficient that only a portion of the variation in the stabilized level is applied to the base of the control transistor $T_2$. This is realized with the voltage divider comprised of resistors $R_2$ and $R_4$, as well as the germanium diode $D_1$. The base-emitter voltage of the silicon transistor $T_2$ is of approximately 0.7 volt, and serves as a reference voltage. When the voltage appearing across resistor $R_4$ and diode $D_1$ becomes larger than desired, the increased collector current of the transistor $T_2$ causes the transistor $T_1$ to enter the operating region, wherein its internal resistance is increased to oppose thereby this increase in voltage.

The stabilization arrangement assures that the potential of the conducting path 34 is maintained constant at substantially −4 volts. Depending upon the position of the sliding terminal 26 coupled to the throttle 18, the resistor 27 provides a variable potential to the terminal $K_2$. Thus, the terminal $K_2$ will have a potential of approximately −1.5 volts, in the idling position of the gas pedal 13, and a potential of −4 volts for full load. Aside from this the tachometer output voltage functions as a selecting switch for the three switching circuits $B_1$, $B_2$ and $B_3$. All three of these switching circuits are designed in accordance with the construction of FIG. 3. Taking the switching circuit $B_2$ as the embodiment for FIG. 3, for example, the construction and operation of the latter is as follows:

The emitters of transistors $T_5$ and $T_6$ lead to the positive terminal of the battery BA by way of the conducting path 30. The base of the input transistor $T_5$ is connected to the capacitor $C_7$. This base is also connected to the output terminal of the tachometer TG, via the resistor $R_{30}$, the conducting path 31, and the diode $D_{30}$. Aside from this, the base is also connected to the terminal $K_2$ associated with the throttle positioned potentiometer 27, by way of the resistors $R_{26}$ and $R_{27}$. Provided that the vehicle speed is substantially zero, the transistor $T_5$ conducts, due to the stabilized voltage across resistor $R_{29}$, and as a result, the switching circuit $B_2$ is in its normally inactive state. This is due to the condition that sufficient base current can flow through the resistor $R_{29}$, the path 34, and the stabilizing transistor $T_1$ and toward the negative supply line 32. The transistor $T_6$ is thereby cut off. The base of the latter is connected to the collector of transistor $T_5$, by way of the resistor $R_{39}$, and also to the conducting path 30 by way of the resistor $R_{41}$. Accordingly, the relay coil F in the collector path of the output transistor $T_6$ is deenergized.

Figure 4:
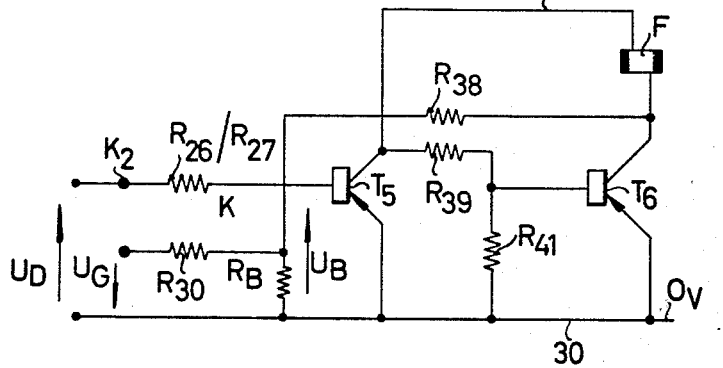
FIG. 4 is an electrical schematic diagram of a representative circuit included in the arrangement of FIG. 2.

When the vehicle speed is increased, the voltage rectified by diode $D_{30}$ and denoted by $U_G$, appears across the resistor $R_{30}$ connected to the resistor $R_{29}$. The latter has applied to it the stabilized voltage as well as the signal variable with the throttled position and denoted by the symbol $U_V$, as shown in FIG. 4. The base voltage prevailing between the base and emitter of the input transistor $T_5$ becomes, accordingly, smaller in its absolute value, and the base potential approaches thereby positive values. When the base potential has reached −0.3 volt, approximately, the input transistor $T_5$ transfers from its heretofore conducting state, into the cut-off state. The output transistor $T_6$ is correspondingly transferred to the conducting state from its heretofore cut-off state. In order to realize rapid response and transfer of states, a resistor $R_{38}$ is provided between the collector of the output transistor $T_6$, and the base of the input transistor $T_5$. This arrangement is similar to that used in the commonly-known monostable switching circuits.

FIG. 4 shows such a monostable switching circuit in simplified form. The feed back resistor $R_{38}$ is connected to both the collector of the output transistor $T_6$ and the coil of the relay F. In this configuration, the voltage within the range of 4 to 7 volts, prevailing between the negative supply line 32 and the positive supply line of the variable battery voltage, has a significant influence upon the value of the vehicle speed with which the circuit switches from its normal quiescent state to its functional state. This condition can be derived directly from FIG. 4. When the transistor $T_6$ is still cut off, the potential of the negative supply line 32 is essentially applied to the feedback resistor $R_{38}$ as a result of the low resistance of the coil F. The resulting current through the resistor $R_{38}$ is thereby varied in relation with the potential of the battery. This same current also flows through the base resistor $R_B$, shown in FIG. 4, and being equivalent to the resistors $R_{29}$, $R_{46}$ and $R_{27}$, in the arrangement of FIG. 3. In this arrangement the switching between states takes place at a higher vehicle speed when the battery voltage is greater, and at a lower vehicle speed when the battery voltage is, correspondingly, smaller.

Figure 3:
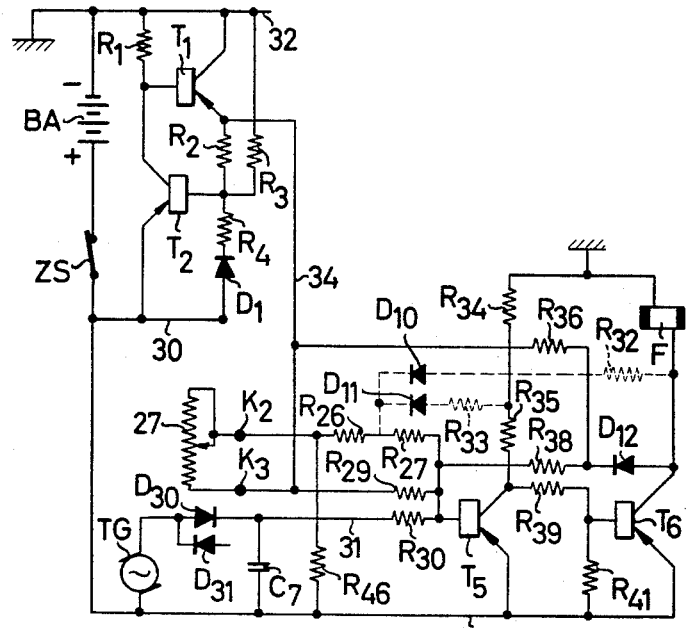
FIG. 3 is an electrical schematic diagram of a simplified portion of FIG. 2.

In order to eliminate this particular undesirable influence of the battery voltage, the invention provides as shown in FIGS. 2 and 3, a diode $D_{12}$ connected between the collector of the output transistor $T_6$ and the feedback resistor $R_{38}$. A resistor $R_{36}$ is also connected to the junction of the diode $D_{12}$ and the resistor $R_{38}$. This resistor $R_{36}$ is in turn, connected to the supply line 34 which is stabilized at −4 volts. As long as the potential of the collector of the transistor $T_6$ is below this stabilized voltage, the diode $D_{12}$ does not conduct. Accordingly, any variations in the battery voltage are isolated from the feedback resistor $R_{38}$. When, however, the transistor $T_6$ becomes conducting and its collector potential rises to approximately −0.8 volt, the diode $D_{12}$ also becomes conducting. As a result, the rise in potential at the collector of transistor $T_6$ is in the desired direction, for actuating the base of the transistor $T_5$. The resistor $R_{38}$ causes the potentional applied to the base of the input transistor to be within the positive region, so that the transistor $T_5$ becomes fully cut off.

The resistors $R_{29}$ and $R_{36}$ are both connected through the stabilized voltage supply line 34, and contribute to the formation of the emitter-base voltage $U_B$ of the input transistor $T_5$. Provided that the battery voltage does not drop below 4 volts, the points at which the switching circuit $B_2$ transfers from second gear into third gear and/or from third gear into second gear, is entirely independent from any variations in the battery voltage.

The switching point of this circuit $B_2$ from second gear to third gear, may differ from that for the reverse position in which the transfer is made from third gear to second gear. This situation is denoted as a hysteresis condition. When the gas pedal is in its full load position, this hysteresis remains constant, since the switching circuit is current-controlled. When transistor $T_5$ conducts and transistor $T_6$ is cut off, the diode $D_{12}$ does not conduct. As a result, the current through the resistors $R_{38}$ and $R_{36}$ maintains the transistors $T_5$ in the conducting state. In the functional state, wherein transistor $T_6$ is conducting, the diode $D_{12}$ also conducts and accordingly, the feedback resistor $R_{38}$ has substantially no current through it. In order that the hysteresis be determined between the transfer from third gear to second gear, and from second gear to third gear, in the idling position of the gas pedal, the arrangement, shown by dotted lines in FIG. 3, may be employed to select the transfer points or the full load position of the gas pedal. In order to influence the driving characteristics of the vehicle in the desired manner, it is preferred that the switching points of the circuits be independently selectable at full load and idling conditions. In this connection FIG. 3 includes two different circuits whereby the hysteresis is increased at full load and decreased when the throttle opening is decreased.

For purposes of increasing the hysteresis, a feedback connection, including a resistor $R_{32}$ and a diode $D_{10}$, may be provided between the collector of the transistor $T_6$ and the base of the input transistor $T_5$. The diode $D_{10}$ is connected so that it does not conduct when the transistor $T_6$ is cut off. Accordingly, the diode $D_{10}$ influences the switching or transfer points at full load as well as idling conditions. At the same time, a voltage divider is included between the terminal $K_2$ and the base of the transistor $T_5$. This voltage divider is comprised of resistors $R_{26}$, and $R_{27}$. The junction of these two resistors of the voltage divider is connected to the diode $D_{10}$.

The resistors $R_{26}$ and $R_{27}$ of the voltage divider should be selected so that the diode $D_{10}$ does not conduct in the idling condition, and with the transistor $T_6$ in the conducting state. Under these conditions, the potential at the terminal $K_2$ is $-1.5$ volts. On the other hand, the resistors should be of the magnitude whereby the diode conducts at full load, when the potential at the terminal $K_2$ is $-4$ volts. At full load and with the transistor $T_6$ conducting, the resistor $R_{27}$ is partially bridged by the resistor $R_{32}$ and, therefore, the current through the resistor $R_{27}$ diminished.

A small amount of current through the resistor $R_{27}$ can cause the transistor $T_5$ to become conducting only when a small amount of current in the opposite direction flows through the resistor $R_{30}$. Expressed in other terms, the switching point from third gear to second gear at full load, becomes lowered. On the other hand, there is no effect upon the switching points between second gear and third gear and from third gear to second gear, at idling conditions, as well as from second gear to third gear, at full load.

A reduction in the hysteresis when the opening of the throttle is increased, may be realized through the resistor $R_{33}$ and the diode $D_{11}$. The voltage divider comprising the resistors $R_{26}$ and $R_{27}$ is selected in conjunction with the resistor $R_{35}$ so that the diode $D_{11}$ does not conduct, when the transistor $T_5$ conducts for the idling position of the gas pedal, corresponding to the condition when the potential of terminal $K_2$ is $-1.50$ volts. For the full load position of the gas pedal, on the other hand, the diode $D_{11}$ is made to conduct. At full load of the gas pedal, therefore, a current flows to the terminal $K_2$, through the resistors $R_{26}$ and $R_{33}$. This current causes in turn, a reduction in the current through the resistor $R_{27}$. Accordingly, the oppositely directed current through the resistor $R_{30}$, intended to cut off the transistor $T_5$, may thereby be reduced. As a result, the speed-sensitive voltage $U_G$ corresponding to the switching point at full load, is lowered. However, the reverse switching points for full load and idling condition, are retained since the diode $D_{11}$ remains ineffective when the transistor $T_5$ is cut off.

The switching circuits $B_1$ and $B_3$ are designed similar to the circuit $B_2$ corresponding to the shifting of gears between second and third. In the circuit $B_1$, the collector of the output transistor $T_4$ leads to the base of the input transistor $T_3$ by way of a diode $D_4$ and a resistor $R_{16}$. A resistor $R_{15}$ is connected between the junction of diode $D_4$ and resistor $R_{16}$, and the supply line 34 stabilized at $-4$ volts. Furthermore, a resistor $R_{11}$ is connected between the base of the input transistor $T_3$, and the supply line 34, for the purpose of providing a base potential which is independent of the battery voltage. At the same time, the speed-sensitive voltage is transmitted across the supply line 31 and the base resistor $R_{13}$. To increase the hysteresis between the points, a feedback circuit is provided including a resistor $R_{21}$ and a diode $D_3$. This feedback circuit is connected between the collector of the output transistor $T_4$ and the junction of resistors $R_9$ and $R_{10}$. The latter two resistors form a voltage divider for transmitting the voltage proportional to the throttle position from the supply line 33, to the base of the input transistor $T_3$. The aforementioned resistors are selected so that at full load and speed of 40 kilometers per hour, the switching circuit $B_1$ transfers from first to second gear at already 25 kilometers per hour for substantially closed throttle. The reverse transfer points for shifting from second into first gear, reside at 30 kilometers per hour for full load, and 15 kilometers per hour for idling condition.

The third switching circuit $B_3$ is provided for shifting gears between third and fourth. At full load, the circuit transfers states at 100 kilometers per hour in going from third to fourth gear, and at 90 kilometers per hour when reversing from fourth to third gear, when idling, the transfer points correspond to 50 kilometers per hour and 40 kilometers per hour, respectively. Through the diode $D_{22}$ and resistor $R_{53}$, the hysteresis of the switching circuit $B_3$ is made smaller in comparison to the switching circuits $B_1$ and $B_2$. The series circuit of diode $D_{22}$ and $R_{53}$ is connected between the junction of resistors $R_{54}$ and $R_{55}$, and the junction of resistors $R_{47}$ and $R_{48}$. The latter two resistors serve as a voltage divider for providing the base of the input transistor $T_7$ with a potential varying with the throttle position. The diode $D_{23}$ operates in conjunction with the resistor $R_{56}$ connected to the supply line 34, and the resistor $R_{58}$ connected to the base of the input transistor, to provide the condition wherein the switching point of the circuit is independent of the battery voltage.

A particular switching sequence is required for the electromagnetic valves and the hydraulic cylinders shown in FIG. 1. In accordance with this switching sequence the magnetic coils 60, 70, 80 and 90 of the magnetic valve $V_6$, $V_7$, $V_8$ and $V_9$ respectively, must be connected in a predetermined manner to the positive supply terminal of the battery.

| For gear stage— | Current is required in— | | | |
| --- | --- | --- | --- | --- |
| 1 | $V_6$ | $V_7$ | $V_8$ | $V_9$ |
| 2 |  | $V_7$ | $V_8$ | $V_9$ |
| 3 | $V_6$ | $V_7$ | $V_8$ |  |
| 4 |  | $V_7$ | $V_8$ |  |

It is essential that voltage signals be applied to the terminals $K_8$ and $K_7$ for every gear shift as well as the disengagement of the clutch 12 and the positioning of the throttle 18. At the same time, valves $V_6$ and $V_9$ are energized simultaneously, only when shifting to first gear. When shifting to second gear, the valve $V_9$, through terminal $K_9$, is energized only. When shifting to third gear, on the other hand, the valve $V_6$, through terminal $K_6$, is energized only. When shifting to fourth gear, both magnetic valves $V_6$ and $V_9$ remain in their non-operating positions shown in FIG. 1.

Two normally-closed switches 40 and 41 shown in FIG. 1 are provided for permitting, after switching circuits $B_1$, $B_2$ and $B_3$ have executed their functions, the aforementioned electromagnetic valves as well as the hydraulic power to reside in their non-operating positions. The limit switch 40 corresponding to second and fourth gears, connects a terminal $K_{10}$ with ground potential. This state of the switch 40 prevails as long as there is no operation in these two gears, and the switch is thereby not opened by a spring counter-acting the spring which tends to keep the switch closed. If on the other hand, the arrangement is operating in second or fourth gear, the piston of the cylinder $Z_1$, opens the switch 40. In a similar manner the limit switch 41, connected to terminal $K_{11}$ is opened when operating in third gear.

In addition to the aforementioned relay B whose switching contact $b$ energizes the coil 70 in every gear, including manual operation, the three electromagnetic relays S, H, B are provided. The relay S energizes the coil 80 of the cut off valve $V_8$, through its switching contact $s$. In a similar manner the relay H energizes the coil 90 of the turning valve $V_9$, through its contact $h$. The relay B, finally, energizes the coils 60 of the translational valve $B_6$, through its switching contact $b$. In order to assure that the relays S, H, B are actuated only in accordance with the aforementioned scheme, they are governed by a predetermined contact switching logic. The latter also prevents erroneous switching connections arising from possible seizures, of the switching contacts $e_1$, $e_2$, $f_1$, $f_2$, $g_1$ and $g_2$ corresponding to relays E, F and G, respectively. The contact switching logic interconnects these relay contacts with the limit switches 40 and 41. A diode logic separate from the preceding contact switching logic, is, moreover, provided for the purpose of retaining the number of contacts associated with relays E, F, and G, at a minimum. This diode logic includes diodes $D_{14}$ to $D_{21}$ interconnecting the coils S, H, B as shown in FIG. 2.

In the automatic mode the contacts $c_1$ and $c_2$ of relay C are in the positions which are opposite to that as shown in the drawing. In the automatic mode of operation, the contact $c_1$ connects relays V and S, and the contact $c_2$ connects the relay coils S, H and B with the positive supply line 30. The contact switching logic and the diode logic operate together, in the automatic mode, in the following manner:

Upon the transmission of the command to switch to first gear, the three relays E, F and G are deenergized, the contact $e_1$ is closed, and the limit switch 41 connected to terminal $K_{11}$ is also closed, provided the operation is not, as yet, in first gear. At this instance, the relay coils B and S are connected to ground potential by way of diodes $D_{16}$ and $D_{19}$, and the diodes $D_{17}$ and $D_{21}$. At the same time, current may flow through the coil of relay H, diode $D_{19}$ and through the coils of relay B towards ground by way of diode $D_{21}$. With the closure of the relay contacts $d$, $s$, $h$, $b$, the magnetic valves $V_7$, $V_8$, $V_9$ and $V_6$ are energized. As a result, the pressurized oil may execute its mechanical function in shifting gears, as already described. Once operation has been transferred to first gear, the limit switch 41 opens and interrupts the connection to the ground. In this manner the four relay coils D, S, H, and B are deenergized.

When the switching circuit $B_1$ transfer states at the predetermined vehicle speed and throttle position, the relay E becomes energized. Accordingly, the contacts $e_1$ opens and the contacts $e_2$ becomes closed. Since the limit switch 40 is closed prior to shifting to second gear, the relays B and S are energized by way of the diodes $D_{16}$ and $D_{18}$, and the path including contact $f_1$, $e_2$ and terminal $K_{10}$. Aside from this, the relay H becomes energized, by way of diode $D_{18}$, and the relay B as well as the magnetic valve $V_6$ remain deenergized, since the diodes $D_{17}$ and $D_{19}$ are not conducting. The energized magnetic valve $V_9$ permits pressurized oil into the right half chamber of the cylinder $Z_2$. The non-energized magnetic valve $V_6$ permits the pressurized oil to act in the upper chamber of the cylinder $Z_1$, on the other hand, so that the gear shift lever 14 is moved into the position corresponding to second gear. As soon as the gear shift lever reaches this position, the limit switch 40 opens and interrupts the current through the relays D, S and H.

With the transmission of a command to shift to third gear, the relays E and F are energized. This implies that the contacts $e_1$ and $f_1$ are opened, while the contacts $e_2$ and $f_2$ are closed. At the same time, the contacts $g_1$ and $g_2$ reside in the positions shown in FIG. 2. Connection to ground potential is, therefore, possible only through the limit switch 41, the terminal $K_{11}$, and the contacts $f_2$ and $g_1$. As a result, and in accordance with the preceding switching scheme for third gear, the relays D, S and B are energized by way of diode $D_{17}$ and $D_{20}$. The relay H, provided for the magnetic valve $V_9$, remains deenergized, since diode $D_{16}$ does not conduct. As a consequence the magnetic valves $V_7$, $V_8$ and $V_6$ are energized, whereas the non-energized magnetic valve $V_9$ remains in the position shown in FIG. 1. In this position, the pressurized oil is admitted into the left chamber of the cylinder $Z_2$ and is able to move the shifting lever into the third-to-fourth shifting path. The energized magnetic valve $V_6$ conducts the pressurized oil into the lower chamber of the cylinder $Z_1$, so that the required shifting to third gear is realized. Once this gear position prevails, the limit switch 41 opens and deenergizes the relays B, S, D.

With the transmission of a command to shift to fourth gear, it is necessary that all three relays E, F and G be energized. The contacts $e_1$, $f_1$ and $g_1$ are thereby opened and the contacts $e_2$, $f_2$ and $g_2$ are thereby closed. A connection to the ground is then possible only through the terminal $K_{10}$ connected to the limit switch 40. However, only the relays D and S become energized. The relays H and B remain deenergized, and the magnetic valves $V_6$ and $V_9$ are thereby situated in their positions, shown in FIG. 1. At the same time, the diodes $D_{16}$ and $D_{17}$ do not conduct. The pressurized oil conducted to the left chamber of the cylinder $Z_2$ and the upper chamber of the cylinder $Z_1$, causes the gear shift lever 14 to be shifted to fourth gear. Once this gear position is achieved, the limit switch 40 opens and deenergizes the relays D and S.

In the description of the preceding modes of operation, it is apparent that only one command signal prevails which commands shifting to the next highest or next lowest gear. In practical situations, however, it is also quite possible to require command or control signals for shifting between two non-adjacent stages, such as from fourth to second gear and vice versa. It would then be necessary that the switching circuits $B_1$, $B_2$ and $B_3$ deliver simultaneously two control signals so that the skipping of gear shifts may be realized. This would produce the result that neither one of the two command or control signals would be effective, due to the switching arrangement of contacts $e_2$ and $f_1$, $f_2$ and $g_1$ and the two limit switches 40 and 41. As already indicated the limit switch 40 corresponds to first and third gear, while the limit switch 41 corresponds to second and fourth gear.

As a result of the diodes $D_{14}$ and $D_{15}$, the control signal for the next adjacent gear position is executed before the control signals corresponding to the after-next gear position. This is realized in the following manner:

When shifting from first to third gear, the vehicle is driven in first gear and at full load corresponding to a speed which is somewhat below the value at which transfer to second gear would take place. Through rapid removal of gas, the speed of the vehicle remains substantially constant during the small shifting interval. As a result of the pronounced influence of the load, upon the transfer points, command signals for second gear and then for third gear, are generated closely behind each other. These command signals are, however, moreover generated faster than the response time of the hydraulic mechanism. The command to shift to third gear must hence be inhibited until second gear is achieved. This is necessary because when still in first gear a command to shift to third provides no output signal. The situation is caused by the condition that the logic cannot differentiate between first and third gear with only two limit switches.

Assume, for example, that the vehicle is in first gear prior to shifting. Terminal $K_{10}$ is connected to ground, by way of limit switch 40, at this instance because the vehicle is not, as yet, in second gear. The intermediate command to shift to second gear with contacts $e_2$ and $f_1$ closed, causes the transistor $T_5$ to conduct through the path of diode $D_{14}$ and resistor $R_{28}$, until the limit switch associated with terminal $K_{10}$ is opened. This corresponds to the vehicle being in second gear. During the period of time that the transistor $K_5$ is maintained in the conducting state, the transistor $T_6$ is cut off. Thus, the stage $T_5$–$T_6$ may switch in an unobstructed manner and shifting from second to third gear may take place.

The shifting from third gear to first gear occurs when the vehicle is driven in third gear at low speed and with little gas. If a substantial amount of gas is now introduced into the engine, the shifting of gears will take place. This shifting from third to first gear will also take place under these circumstances during severe braking at low speed, when the braking interval is shorter than that consumed by the shifting process.

Assume the operating condition with the terminal $K_{10}$ connected to ground corresponding to the state wherein shifting to second gear has not, as yet, been accomplished, so that the limit switch 40 is still closed. With the transmission of the intermediate command to shift to second gear, with contacts $e_2$ and $f_1$ closed, the transistor $T_4$ is maintained conducting through the path of the diode $D_{14}$ and resistor $R_{19}$. The relay E remains now energized until the limit switch 40 opens, corresponding to the completion of the shifting process to second gear. After that, the stage $T_3-T_4$ may switch and the shifting process from second to first gear may take place.

The shifting from second to fourth gear takes place when the vehicle is in second gear at high speed with substantial gas fed to the engine, and the amount of gas thus introduced into the engine, is suddenly reduced. Assume that the terminal $K_{11}$ is connected to ground corresponding to the state wherein shifting to third gear has not been completed and the limit switch 41 is accordingly, still closed. As a result of the intermediate command to shift the third gear with the contacts $f_2$ and $g_1$ closed, the transistor $T_7$ is maintained conducting and the transistor $T_6$ is maintained cut off, through the path of diode $D_{15}$ and the resistor $R_{49}$. This condition prevails until the limit switch 41, associated with terminal $K_{11}$, is opened, implying that shifting from third gear has been completed. After that, the stage $T_7-T_8$ may switch and shifting from third to fourth gear may take place.

The shifting from fourth to second gear takes place when the vehicle is in fourth gear at low speed and in idling condition, when a substantial amount of gas is suddenly fed to the engine. Assume that terminal $K_{11}$ is connected to ground, corresponding to the condition that limit switch 41 is closed because shifting to third gear has not been completed. Due to the intermediate command to shift to third gear, with contacts $f_2$ and $g_1$, closed, the transistor $T_6$ is maintained conducting through the path of diode $D_{15}$ and resistor $R_{40}$. Relay F is, in this manner, energized until the limit switch 40, associated with the terminal $K_{11}$, is opened, corresponding to the complete shifting to third gear. After that the stage $T_5-T_6$ may switch and the shifting from third to second gear may take place.

It is to be noted that the additional circuitry provided for skipping of gears, should not interfere with the normal shifting between consecutive gears. Accordingly, the arrangement is designed so that when shifting from first to third gear, for example, the already conducting transistor $T_5$ has its conductivity increased through the path of diode $D_{14}$ and resistor $R_{28}$. Aside from this, the diodes $D_{14}$ and $D_{15}$ serve the purpose of isolating, from the switching circuits, the spike voltages associated with the output relay.

The diodes $D_{18}$ and $D_{20}$ do not participate in the actual switching functions. They do, however, inhibit oscillations of the control circuitry, in particular operating states. For purposes of illustration, the function of diode $D_{18}$ is described. Assume that the diode $D_{18}$ is bridged or shorted, and that the vehicle is in second gear, implying that contacts $e_2$ and $f_2$ are closed. Moreover, contact $e_1$ is open and the terminal $K_{11}$ is connected to ground. When shifting to first gear, the contact $e_1$ closes, and the transistor $T_4$, previously cut off, becomes conducting through the path of $e_1$, $D_{19}$, and $R_{19}$. Contact $e_1$ is then again opened, and the shifting command for first gear, cuts off again the transistor $T_4$. Under these conditions the circuitry would thereby become oscillatory. In this connection the diode $D_{18}$ serves the purpose of blocking the path to ground, through the diode $D_{19}$ and the contact $e_1$.

In the on-off switching circuit W, a bistable circuit, as commonly known in the art is formed through the transistors $T_9$ and $T_{10}$, base resistors $R_{64}$ and $R_{72}$, feedback resistors $R_{67}$ and $R_{71}$, resistor $R_{65}$ and the coil of relay C. In accordance with the usual operation of such a bistable circuit, one of the transistors conducts while the other is cut off. The dividing characteristics of the resistors $R_{67}-R_{72}$, as well as the resistors $R_{64}-R_{71}$, are essential for the possible cut off states of the transistors. If, for example, the transistor $T_9$ conducts through its collector resistor $R_{65}$, then transistor $T_{10}$ is cut off. Relay C remains, hence, deenergized, and the contacts $c_1$ and $c_2$ are in the positions shown in FIG. 2. The contact $c_2$ retains thereby the relays C, H and B disconnected from the positive supply line. The electronic circuitry is thereby not adapted for automatic shifting. The relay D associated with the clutch actions, can, however, become energized through touching of the gear shift lever 14, regardless of the mode of operation. This is because the contact $c_1$ connects the coil of the relay D with the terminal $K_{14}$ connected directly to the positive supply line 30. Furthermore, the transistor $T_9$ is made conducting by every actuation of the manual shifting lever 14, through the path of resistor $R_{61}$ and the diode $D_{26}$. In this manner, the automatic mode is inoperable. When releasing the manual shifting lever 14, the diode $D_{26}$ serves the purpose of preventing transistor $T_9$ to become cut off again as a result of the positive spike voltage associated with relay B.

The capacitor $C_2$ and the resistor $R_{63}$ serve the purpose of making transistor $T_9$ conducting, as soon as the power supply is connected through the closure of the ignition switch ZS. The operating state "Non-automatic" is, accordingly, essential, because otherwise, when starting the engine, shifting to first gear would immediately occur, and, the vehicle may be set into motion at high engine speed. The capacitor $C_4$ serves to stabilize the switching circuit W, against false signals. The resistor $R_{69}$ limits the base currents. In the "Non-automatic" mode with transistor $T_{10}$ cut off, the lamp L glows by being connected to the positive supply line, by way of the contact $c_2$.

By transferring the selector switch 15 from its off position "Zero" to its on position "A" the terminal $K_{13}$ is connected to ground, and the switching circuitry is transferred to its corresponding state. If, in this instance, the transistor $T_9$ is conducting and the transistor $T_{10}$ is cut off, then the capacitor $C_3$ is not charged and the capacitor $C_5$ is charged substantially to the battery voltage. Although the terminal $K_{13}$ is in contact with ground potential, as a result of the transfer of the selector switch 15, the capacitor $C_5$ cannot become further charged. This is due to the condition that its voltage is already closed to the value of the battery supply, and the diode $D_{28}$ does not conduct due to the voltage drop across the resistor $R_{67}$. The transistor $T_{10}$ becomes, however, conducting because at the first instant when connecting to ground by way of the switch 15, the substantially uncharged capacitor $C_3$ receives a charging current through the diode $D_{27}$ and the protective resistor $R_{68}$. This charging current flows partially through the emitter-base path of the transistor $T_{10}$, and causes the latter to become thereby conducting. The capacitor $C_5$ can discharge across the resistor $R_{70}$, only when the terminal $K_{13}$ is again disconnected from ground potential. The time constants derived from the products of $C_3$ and $R_{66}$, and $C_5$ and $R_{70}$, are of specific values for the recovery period of this circuitry. The diodes $D_{27}$ and $D_{28}$ should uncouple the capacitors $C_3$ and $C_5$, so that they may charge and discharge independently from each other.

The switching circuit W has, furthermore the task of disconnecting the automatic mode, when the safety system described below is applied. This safety system GS comprises two transistors $T_{11}$ and $T_{12}$ and a feedback protective circuit RS, having a transistor $T_{13}$.

The safety circuitry includes the transistors $T_{11}$ and $T_{12}$, the associated resistors $R_{74}$ and $R_{87}$, the capacitors $C_8$ and $C_9$, and the diodes $D_{32}$ and $D_{34}$. In principle, this safety circuit corresponds to a bistable switching stage. The base potentials of the transistors $T_{11}$ and $T_{12}$ are derived through the dividing characteristics of the resistors $R_{77}$ and $R_{82}$ as well as the resistors $R_{86}$ and $R_{84}$, in a manner to be described. The vehicle must be driven at a minimum speed, so that the safety system may be applied when, for example, the tachometer TG fails. In order that this minimum speed be independent of the varying battery voltage, the two transistors $T_{11}$ and $T_{12}$ are connected to the stabilized supply line 34 through their collectors and resistors $R_{78}$ and $R_{87}$, respectively. The capacitor $C_9$, and resistor $R_{83}$ form a base coupling for preventing inadvertent switching of the stage through noise signals. Upon actuation of the ignition switch ZS, the transistor $T_{11}$ becomes conducting through the capacitor $C_8$ and the resistor $R_{76}$. The transistor $T_{12}$ is thereby cut off. If the safety circuit GS is transferred to its other state in which transistor $T_{11}$ is cut off and transistor $T_{12}$ is conducting, the transistor $T_9$ is maintained in the conducting state. This is accomplished through the cut-off transistor $T_{11}$ and the diode $D_{25}$ as well as resistor $R_{62}$. In this manner, only manual switching can take place.

The resistor $R_{74}$ is of somewhat higher value than the resistor $R_{75}$. The equal and oppositely directed voltages made proportional to the output of the tachometer TG through the rectifiers $D_{30}$ and $D_{31}$, are applied to the capacitors $C_6$ and $C_7$. As a result the negative potential on capacitor $C_7$ has a stronger effect and the diode $D_{32}$ remains thereby nonconducting. The transistor $T_{11}$ conducts, however, as long as the vehicle is in motion. At the same time, resistor $R_{80}$ has a somewhat lower value than the resistor $R_{79}$. This implies that the diode $D_{34}$ is not conducting when the vehicle is in motion, and the transistor $T_{12}$ retains thereby its cut-off state. The two time constants $t_1$ and $t_2$ determine by the capacitors $C_7$ and $C_6$ in conjunction with their associated resistors, are so small that when braking severely, the voltages on capacitors $C_6$ and $C_7$ can follow precisely the varying speed. The safety system remains thus inactive. The time constants $t_1$ determined by the capacitor $C_7$ and its associated resistors, is approximately twenty times larger than the time constant $t_2$. If the line leading from the tachometer TG to the rectifiers $T_{30}$ and $T_{31}$, becomes interrupted, the voltage and capacitor $C_6$ will thereby drop 20 times faster than the voltage on capacitor $C_7$. As a result a positive voltage signal and hence current signal is generated which cuts off transistor $T_{11}$ through resistor $R_{74}$ and diode $D_{32}$. The transistor $T_{12}$ cannot be held in its cut off state through resistor $R_{80}$, because of the polarity of the diode $D_{34}$. This new state of the switching circuit is retained for as long as the transistor $T_{11}$ is again made conducting through actuation of the ignition switch ZS.

To inhibit resetting when the tachometer is defective, the resistors $R_{79}$ and $R_{80'}$ as well as diodes $D_{32}$ and $D_{34}$ are not required. The additional controlling of the transistors $T_{12}$ through resistors $R_{79}$ and $R_{80}$, is provided for purposes of safety. If for example, the voltage on capacitor $C_7$ degenerates as a result of a short circuit, the safety system can be applied only through the transistor $T_{12}$. Under these circumstances, the resetting circuit, to be described, could not be applied because the voltage provided by the capacitor $C_7$, as a function of speed, would be zero. Due to the possibility of controlling the transisor $T_{12}$ through the resistor $R_{85}$ and the resetting circuit RS, the switched stage GS must remain, in every mode of operation, in the state wherein the transistor $T_{11}$ is cut off and transistor $T_{12}$ conducts. The diode $D_{32}$ provides assurance that the cut off transistor $T_{11}$ cannot become conducting through the resistor $R_{75}$. The diode $D_{34}$ functions to assure that the transistor $T_{12}$ cannot become cut off through the resistor $R_{80}$.

When the control arrangement fails as a result of, for example, the seizure of a relay contact, the magnetic valves may be subjected to a command which does not correspond to the instantaneous vehicle speed and the position of the gas pedal. In order to prevent a dangerous shifting into lower gear, when such failures prevail, the signals at the output terminals $K_6$ and $K_9$ are compared with the vehicle speed. If a combination of signals results which would cause an undesirable shifting to a lower gear, the resetting circuit becomes activated and, through the safety circuit GS, switches the circuit W into its "off" state.

The resetting circuit RS includes the transistor $T_{13}$ and the associated resistors $R_{88}$ to $R_{95}$ as well as the diodes $D_{35}$ and $D_{36}$. The resetting circuit interrogates the shifting commands at the circuit outputs, and determines, after a comparison process with the instantaneous vehicle speed, if shifting is permissible. If such shifting is not permissible, the transistor $T_{13}$ becomes cut off. Accordingly, the transistor $T_{12}$ becomes conducting, the transistor $T_{11}$ is cut off, and the control arrangement for automatic operation becomes thereby ineffective through the circuitry including transistors $T_9$ and $T_{10}$. The detailed steps for such operation may be described in the following manner:

Upon the command to shift to first gear, the contacts $b$ and $h$ are closed. The resistors $R_{90}$ and $R_{91}$ are thereby connected to the positive supply terminal of the battery, by way of diodes $D_{35}$ and $D_{36}$. The resistor $R_{94}$ retains transistor $T_{13}$ in the conducting state. When the vehicle speed is increased, the positive rectified voltage on capacitor $C_7$, reduces the base current of the transistor $T_{13}$ to resistor $R_{93}$ until the transistor $T_{13}$ is cut off. This corresponds to a vehicle speed $v_1$. If now the automatic control arrangement is defective and seeks to shift to first gear from either fourth, third or second gear, when the vehicle speed is greater than $v_1$, the transistor $T_{13}$ becomes cut off and the safety system becomes activated. The transistor $T_{13}$ is thereby controlled so that its operating characteristics are rapidly passed through. Thus, the actuating threshold depends little on the amplification of the transistor.

Upon the command to shift to second gear, the contact $b$ is opened, and the contact $h$ becomes closed. The transistor $T_{13}$ receives no additional base current through the resistors $R_{91}$ and $R_{88}$. With a vehicle speed $v_2$ necessarily greater then $v_1$, the transistor $T_{13}$ becomes cut off. If, now, the automatic arrangement seeks to shift to second gear from either fourth or third gear, when the speed is greater than $v_2$, the safety system becomes activated. Upon the command to shift to third gear, the contact $h$ is opened, and the contact $b$ is closed. If the total resistance of resistors $R_{90}$ and $R_{89}$ is made smaller than $R_{91}$ and $R_{88}$, the "cut off speed" $v_3$ for third gear, is greater than $v_2$. If both contacts $h$ and $b$ are open, the safety system becomes activated at a speed $v_4$. If both contacts $h$ and $b$ are open, the shifting to fourth gear is implied when the vehicle is situated in any other gear or any other condition. The speed $v_4$ must be greater than the maximum possible vehicle speed. When the control arrangement operates properly, the maximum speed which may prevail within first gear, must be at least so high as the transfer point from second gear to first gear at full load. For safety reasons, it is thus desirable to make $v_1$ somewhat greater than this transfer point at full load. At the same time, the speed $v_2$ must be made somewhat greater than the reverse transfer point from third gear to the second gear at full load. The speed $v_3$ must also be made greater than the transfer points switching from fourth gear to first gear at full load.

Only three speeds may be freely selected, since the fourth speed is determined automatically. The transfer points to lower gears at full load, as well as the maximum speed are, however, such that all four speeds $v_1$, $v_2$, $v_3$ and $v_4$ may be set to the desired values.

While the invention has been illustrated and described as embodied in motor vehicles, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An electric control arrangement for automatic shifting of gears in a motor vehicle, comprising, in combination, tachometer means providing an output voltage proportional to the speed of said vehicle; a plurality of electronic switching circuits each connected to said output voltage and actuated thereby at a predetermined different value of said output voltage, said switching circuits being inter-connected with each other so that when one of said switching circuits is actuated by said output voltage, the other switching circuits remain unactuated; voltage supply means for energizing said switching circuits; voltage stabilizing means connected to said voltage supply means and providing a voltage level independent of variations in the potential of said voltage supply; circuit operation stabilizing means connected to said voltage stabilizing means and acting upon each of said switching circuits to maintain the operation of said switching circuits independent of fluctuation of the voltage supply; electromagnetic means connected to each of said switching circuits and energized thereby; variable resistor means connected to said voltage stabilizing means and mechanically coupled to the gas pedal of said vehicle for varying the resistance value of said variable resistor means in accordance with the position of said gas pedal and thereby vary the resistance value of said variable resistor means as a function of the load of said vehicle; and operating means actuated by said electromagnetic means when energized for automatic shifting of gears of said motor vehicle in a predetermined manner.

2. The electronic control arrangement as defined in claim 1, including an input transistor and an output transistor, in each of said switching circuits, the collector of said output transistor being connected to said electromagnetic means; a first diode connected to the collector of said output transistor; a first resistor connected to said diode and to the base of said input transistor; a second resistor connected to said voltage stabilizing means and to the junction of said first diode and said first resistor; at least one coupling resistor connected between said variable resistor means and the base of said input transistor; a third resistor connected between said tachometer means and the base of said input transistor; a resistor network connected in series with the base of said input transistor for conducting actuating signals thereto; and a diode feedback circuit connected between the electrode of said output transistor and the base of said input transistor, said diode feedback circuit inhibiting current flow therethrough when said output transistor is in the non-conducting state and thereby decrease the hysteresis prevailing when shifting between consecutive gears.

3. An electronic control arrangement as defined in claim 2, wherein at least one of said electronic switching circuits includes a coupling diode network connected between the collector and base of said input transistor, said coupling diode network inhibiting current flow therethrough when said input transistor is in the non-conducting state to thereby reduce the hysteresis prevailing in shifting between consecutive gears of said vehicle.

4. An electronic control arrangement as defined in claim 3, including a resistor connected in series with said coupling diode network.

5. An electronic control arrangement as defined in claim 3, including two series connected resistors transmitting actuating signals to the base of said input transistor, the junction of said series connected resistors being connected to said coupling diode network.

6. An electronic control arrangement as defined in claim 1, including a manual gear shift lever; a first switching means actuated by said lever when the latter is grasped manually; and a bistable switching circuit connected to said first switching means and inhibiting automatic shifting of gears when said shifting lever is grasped manually.

7. An electronic control arrangement as defined in claim 6, wherein said bistable switching circuit includes a first transistor and a second transistor; an electromagnetic relay having at least one switching contact for conducting current to said switching circuits to shift gears automatically; and a manual switching means connected to the base of said second transistor for providing automatic shifting of gears, the base of said first transistor being connected to said first switching means.

8. An electronic control arrangement as defined in claim 7, including a clutch-operating relay controlled through the switching contacts of said electromagnetic relay for disengaging the clutch of said vehicle when shifting gears automatically.

9. An electronic control arrangement as defined in claim 8, including a safety control circuit for monitoring the output voltage of said tachometer and connected to said bistable switching circuit so that automatic shifting of gears is inhibited when the tachometer output voltage reduces more rapidly than the largest braking period possible with the vehicle.

10. The electronic control arrangement as defined in claim 9 including a bistable multivibrator in said safety control circuit, said bistable multivibrator having an input transistor and an output transistor, a capacitor, and a diode connected to the base of said input transistor and said capacitor; and rectifier means connected to the output of said tachometer means and to said safety control circuit, said rectifier means having two diodes connected in series with the junction between the diodes connected to one terminal of said tachometer means, a first filter capacitor connected between the other terminal of said tachometer means and one of said diodes, and a second filter capacitor connected between said other terminal of said tachometer means and the other one of said diodes.

11. An electronic control arrangement as defined in claim 1, including limit switches for controlling said operating means.

12. An electronic control arrangement as defined in claim 1 including a first limit switch associated with the first and third gear of said motor vehicle; and a second limit switch associated with the second and fourth gear of said motor vehicle, said first and second limit switches controlling said operating means.

13. An electronic control arrangement as defined in claim 1, including a contact switching logic connected to said electronic switching circuit and providing a predetermined sequence in shifting gears automatically.

14. An electronic control arrangement as defined in claim 1, including two electromagnetically operated hydraulic valves; and electromagnetically operated cut-off valves operating in conjunction with said electromagnetically operated hydraulic valve; and a relay connected to said cut off valve.

15. An electronic control arrangement as defined in claim 1 including reverse shifting safety means for inhibiting shifting to a lower gear when the output voltage of said tachometer is at a substantially predetermined high level.

16. An electronic control arrangement for automatic shifting of gears in a motor vehicle comprising, in-combination, an electromechanical tachometer means providing an output voltage proportional to the speed of said vehicle; a plurality of electronic switching circuits each connected to said output voltage and actuated thereby at a predetermined different value of said output voltage, said switching circuits being interconnected with each other so that when one of said switching circuits is actuated by said output voltage, the other switching circuits remain unactuated; voltage supply means comprising a DC battery for energizing said switching circuits; voltage stabilizing means connected to said voltage supply means and providing a voltage level independent of variations in the potential of said voltage supply; circuit operation stabilizing means connected to said voltage stabilizing means and acting upon each of said switching circuits to maintain the operation of said switching circuits independent of fluctuations of the voltage supply; electromagnetic means connected to each of said switching circuits and energized thereby, said electromagnetic means comprising an electromagnetic relay; variable resistor means connected to said voltage stabilizing means and mechanically coupled to the gas pedal of said vehicle for varying the resistance value of said variable resistor means in accordance with the position of said gas pedal and thereby vary the resistance value of said variable resistor means as a function of the load of said vehicle; operating means actuated by said electromagnetic means when energized for automatic shifting of gears of said motor vehicle in a predetermined manner; an input transistor and an output transistor in each of said switching circuits, the collector of said output transistor being connected to said electromagnetic means; a first diode connected to the collector of said output transistor; a first resistor connected to said diode and to the base of said input transistor; a second resistor connected to said voltage stabilizing means and to the junction of said first diode and said first resistor; at least one coupling resistor connected between said variable resistor and the base of said input transistor; a third resistor connected between said tachometer means and the base of said input transistor; a resistor network connected in series with the base of said input transistor for conducting actuating signals thereto; a diode feedback circuit connected between the electrode of said output transistor and the base of said input transistor, said diode feedback circuit inhibiting current flow therethrough when said output transistor is in the non-conducting state and thereby decrease the hysteresis prevailing when shifting between consecutive gears; a tachometer output resistor connected between said tachometer means and the base of said input transistor; a coupling diode network in at least one of said electronic switching circuits and connected between the collector and base of said input transistor of said switching circuit, said coupling diode network inhibiting current flow therethrough when said input transistor is the non-conducting state to thereby reduce the hysteresis prevailing in shifting between consecutive gears of said vehicle; a series resistor connected in series with said coupling diode network; two series connected base resistors transmitting actuating signals to the base of said input transistor of said switching circuit, the junction of said base resistors being connected to said coupling diode network; a manual gear shift lever; a first switching means actuated by said lever when the latter is grasped manually; a bistable switching circuit connected to said first switching means and inhibiting automatic shifting of gears when said shifting lever is grasped manually; a first transistor and a second transistor included in said bistable switching circuit; an electromagnetic relay having at least one switching contact for conducting current to said switching circuits to shift gears automatically; manual switching means connected to the base of said second transistor for providing automatic shifting of gears, the base of said first transistor being connected to said first switching means; a clutch-operating relay controlled through the switching contacts of said electromagnetic relay which has at least one switching contact for conducting current to said switching circuits, said clutch-operating relay disengaging the clutch of said vehicle when shifting gears automatically; a first limit switch associated with the first and third gear of said motor vehicle; a second limit switch associated with the second and fourth gear of said motor vehicle, said first and second limit switches controlling said operating means; a contact switching logic connected to said electronic switching circuit in providing a predetermined sequence in shifting gears automatically; a safety control circuit for monitoring the output voltage of said tachometer and connected to said bistable switching circuits so that automatic shifting of gears is inhibited when the tachometer output voltage reduces more rapidly than the largest braking period possible with the vehicle; a bistable multivibrator in said safety control circuit, said bistable multivibrator having an input transistor and an output transistor, a capacitor, and a diode connected to the base of said input transistor and said capacitor; and rectifier means connected to the output of said tachometer means and to said safety control circuit, said rectifier means having two diodes connected in series with the junction between the diodes connected to one terminal of said tachometer means, a first filter capacitor connected between the other terminal of said tachometer means and one of said diodes, and a second filter capacitor connected between said other terminal of said tachometer means and the other one of said diodes.

References Cited

UNITED STATES PATENTS

| | | | |
|---|---|---|---|
| 2,995,949 | 8/1961 | Gelenios et al. | 74—365 |
| 3,068,715 | 12/1962 | Brennan et al. | 74—365 |
| 3,267,762 | 8/1966 | Reval | 74—365 |
| 3,301,085 | 1/1967 | De Castelet | 74—365 |

DONLEY J. STOCKING, *Primary Examiner.*

H. S. LAYTON, *Assistant Examiner.*

U.S. Cl. X.R.

74—365; 339—256